United States Patent
Kubota et al.

[11] Patent Number: 5,963,357
[45] Date of Patent: Oct. 5, 1999

[54] OPTICAL MODULATOR

[75] Inventors: Yoshinobu Kubota; Yasuhiro Omori, both of Kawasaki; Toshihiro Otani; Tomoyuki Itoh, both of Sapporo, all of Japan

[73] Assignee: Fujitsu Limited, Kawasaki, Japan

[21] Appl. No.: 08/891,785

[22] Filed: Jul. 14, 1997

[30] Foreign Application Priority Data

Feb. 12, 1997 [JP] Japan ................................ 9-028208

[51] Int. Cl.$^6$ .............................. G02F 1/035; G02F 1/03
[52] U.S. Cl. ............................ 359/239; 359/187; 385/2; 385/3
[58] Field of Search .................................... 359/187, 181, 359/245, 260, 276, 239; 385/2, 3

[56] References Cited

FOREIGN PATENT DOCUMENTS

| | | |
|---|---|---|
| 3-145623 | 6/1991 | Japan . |
| 3-251815 | 11/1991 | Japan . |
| 4-24610 | 1/1992 | Japan . |
| 5-53086 | 3/1993 | Japan . |
| 5-134220 | 5/1993 | Japan . |

*Primary Examiner*—Georgia Epps
*Assistant Examiner*—Margaret Burke
*Attorney, Agent, or Firm*—Stass & Halsey

[57] ABSTRACT

An optical modulator for modulating light emitted from a signal light source has a substrate having electrooptic effect, an optical waveguide of a Mach-Zehnder type formed on the substrate, an electrode formed on the substrate to control light propagated in the optical waveguide, an interference light generating means for making radiation light radiated from the optical waveguide and signal light leaking from the optical waveguide interfere with each other to generate interference light, and emitting the interference light from an end surface of the substrate, a photo-detector for monitoring the interference light of the radiation light and the signal light, and a signal controlling circuit for controlling an operating point of the optical modulator according to a change of the interference light monitored by the photo-detector It is thereby possible to prevent degradation of a distinction ratio due to a shift of the operating point of the optical modulator so as to allow stable optical modulation, while facilitating a design of the mechanism of the optical modulator.

22 Claims, 17 Drawing Sheets

FIG. 6

| | DIFFUSION CONDITION | D (mm) | PHASE | RDC (A/W) | RAC (A/W) | REFERRED DRAWINGS | Y (μm) |
|---|---|---|---|---|---|---|---|
| (1) | 1000°C, 8h | 12 | SAME | 0.0080 | 0.0037 | FIG.11~FIG.13 | 750 |
| (2) | 1040°C, 8h | 15 | INVERTED | 0.0061 | 0.0060 | FIG.14~FIG.16 | 750 |
| (3) | 1040°C, 8h | 10 | SAME | 0.0132 | 0.0040 | FIG.17~FIG.19 | 750 |
| (4) | 1050°C, 10h | 8 | INVERTED | 0.0077 | 0.0062 | FIG.20~FIG.22 | 550 |

OPTICAL MODULATOR

BACKGROUND OF THE INVENTION

(1) Field of the Invention

The present invention relates to an optical modulator suitable for use as an external optical modulator for modulating light emitted from a signal light source, in a transmitting unit of, for example, an ultra high-speed optical communication system.

(2) Description of Related Art

There has been used, in a transmitting unit of an optical communication system, an optical modulator in a direct modulation system which modulates an electric current flowing in a semiconductor laser with a data signal, as an optical modulator which modulates light emitted from, for example, a semiconductor laser as a signal light source.

However, a recent demand for high-speed optical communication system is accompanied with a necessity for high-speed optical modulation. If light is modulated at a high speed using such optical modulator in a direct modulation system, an effect of a wavelength fluctuation (chirping) of emitted signal light becomes greater, which leads to wavelength dispersion in an optical fiber. As a result, a long-distance transmission becomes difficult.

It is therefore necessary to use an external modulator which does not generate chirping in principle when light is modulated at a high speed. As an example of the above external modulator, there is an optical modulator of a Mach-Zehnder type shown in FIG. 29. Incidentally, FIG. 30 is a perspective view of the optical modulator 100 of a Mach-Zehnder type shown in FIG. 29, looking from an outputting side thereof.

As shown in FIG. 29, the optical modulator 100 of a Mach-Zehnder type has an optical waveguide device 101 of a Mach-Zehnder type, a photo-detector 107 and a signal controlling circuit (ABC circuit; automatic bias control circuit) 108.

An optical waveguide 104 of a Mach-Zehnder type is formed on a substrate 101a, further a travelling-wave electrode 102 and a grounding electrode 103 are formed on the optical waveguide 104, whereby the optical waveguide device 101 of a Mach-Zehnder type is formed.

The substrate 101a is a lithium niobate (LiNbO$_3$) substrate having electrooptic effect.

The optical waveguide 104 of a Mach-Zehnder type has an input waveguide 104a, an output waveguide 104b and intermediate waveguides 104c and 104d. The intermediate waveguides 104c and 104d are disposed in parallel, and connected to the input waveguide 104a and the output waveguide 104b at a Y-shaped splitting portion Q$_1$ and a Y-shaped recombining portion Q$_2$.

A metal such as titanium (Ti) or the like is selectively diffused in only the optical waveguide portion in the substrate 101a of the optical waveguide 104, whereby a refractive index of that portion is larger than a refractive index of another portion.

The travelling-wave electrode 102 and the grounding electrode 103 are used to control light propagated in the optical waveguide 104, which are formed by evaporating a metal such as gold (Au) or the like on the intermediate waveguides 104c and 104d of the optical waveguide 104, as shown in FIG. 29.

Into the input waveguide 104a of the optical waveguide 104, direct-current light emitted from a semiconductor laser 111 is inputted through an optical fiber 105a. From the output waveguide 104b of the optical waveguide 104, modulated signal light is outputted to the photo-detector 112 through an optical fiber 105b.

The optical fiber 105a is a constant polarization fiber, whereas the optical fiber 105b is a single-mode fiber.

The photo-detector 112 receives the signal light outputted through the optical fiber 105b to convert it into an electric signal.

An optical fiber 106 is directly attached, in addition to the above-mentioned optical fiber 105b, onto an end of the substrate 101a on the outputting side, through which radiation light generated at the Y-shaped recombining portion Q$_2$ of the optical waveguide 104 is inputted to the photo-detector 107.

Incidentally, the optical fiber 106 is a multi-mode fiber.

The photo-detector 107 receives the radiation light inputted through the optical fiber 106 to convert the received radiation light into an electric signal, and outputs the electric signal to the signal controlling circuit 108, thereby monitoring the radiation light.

The photo-detector 107 is connected to the signal controlling circuit 108, which varies direct-current bias of an inputted electric signal to be applied to the travelling-wave electrode 102 according to a result of the monitoring by the photo-detector 107 (that is, according to a change of a light output electric signal from the photo-detector 107).

In the optical modulator 100 of a Mach-Zehnder type, an operating point of the optical modulator 100 of a Mach-Zehnder type is generally shifted with time elapsed due to temperature drift, DC drift, stress and the like.

Now, shift of the operating point of the optical modulator 100 of a Mach-Zehnder type will be explained with reference to FIG. 31.

FIG. 31 is a diagram showing an input-output characteristic of the optical modulator 100 of a Mach-Zehnder type. In FIG. 31, ① indicates the characteristic before the operating point is shifted, and ② indicates the characteristic in the case where the operating point has been shifted.

As shown in FIG. 31, the input-output characteristic of the optical modulator 100 of a Mach-Zehnder type has periodicity to a driving voltage.

Use of driving voltages $V_0$ and $V_1$ at which an upper peak value and a lower peak value of an output light power are obtained according to a logical multiplication of an input signal enables efficient binary modulation.

However, if the driving voltages $V_0$ and V1 are constant even in the case where the operating point is shifted, an extinction ratio of a signal light outputted from the optical modulator 100 of a Mach-Zehnder type is degraded because of the above-mentioned periodicity as shown in FIG. 31.

When the operating point is shifted, it is therefore necessary to control the operating point assuming the driving voltages $V_0$ and $V_1$ as ($V_0$+dV) and ($V_1$+dV), respectively, if a quantity of the shift is dV.

In the optical modulator 100 of a Mach-Zehnder type shown in FIG. 29, the photo-detector 107 monitors radiation light generated at the Y-shaped recombining portion Q$_2$ of the optical waveguide 104, the signal controlling circuit 108 varies direct-current bias of an input electric signal to be applied to the travelling-wave electrode 102, whereby the operating point of the optical modulator 100 of a Mach-Zehnder type is controlled.

Incidentally, reference numeral 109 denotes an input signal source, and reference numeral 110 denotes a termination resistor.

In the optical modulator 100 of a Mach-Zehnder type with the above structure shown in FIG. 29, direct-current light (incident light) from the semiconductor laser 111 is inputted to the input waveguide 104a of the optical waveguide 104 through the optical fiber 105a, split into two at the Y-shaped splitting portion $Q_1$, then propagated in the intermediate waveguides 104c and 104d.

If a high-frequency modulating signal voltage is applied to the travelling wave electrode 102 at this time, a phase difference is generated between the split incident lights by the electrooptic effect in the intermediate waveguides 104c and 104d, and the incident lights whose phases are different are again combined at the Y-shaped recombining portion $Q_2$.

By setting the driving voltages at this time such that the phase difference between the incident lights in the intermediate waveguides 104c and 104d is 0 and $\pi$, an ON/OFF optical pulse signal can be obtained as signal light to be outputted, and modulated signal light is outputted from the output waveguide 104b of the optical waveguide 104.

The signal light outputted from the output waveguide 104b is received by the photo-detector 112 through the optical fiber 105b to be converted into an electric signal.

On the other hand, the radiation light generated at the Y-shaped recombining portion $Q_2$ of the optical waveguide 104 is received by the photo-detector 107 through the optical fiber 106, converted into an electric signal, then outputted to the signal controlling circuit 108.

The signal controlling unit 108 varies direct-current bias of the input electric signal to be applied to the travelling-wave electrode 102 according to a change of the light output electric signal from the photo-detector 107, thereby controlling the operating point of the optical modulator 100 of a Mach-Zehnder type.

According to the optical modulator 100 of a Mach-Zehnder type shown in FIG. 29, the photo-detector 107 monitors radiation light generated at the Y-shaped recombining portion $Q_2$ of the optical waveguide 104, the signal controlling circuit 108 controls the operating point of the optical modulator 100 of a Mach-Zehnder type on the basis of a result of the monitoring by the photo-detector 107, whereby the operating point of the optical modulator 100 of a Mach-Zehnder type can be stabilized. As a result, it is possible to prevent degradation of signal light as shown in FIG. 31 so that stable optical modulation is possible.

The optical modulator 100 of a Mach-Zehnder type shown in FIG. 29 has, however, disadvantages that it is necessary to align the optical fiber 106 since the optical fiber 106 is used when the radiation light generated at the Y-shaped recombining portion $Q_2$ of the light waveguide 104 is monitored, and that there is a difficulty in designing the structure.

Namely, the optical fiber 105b to which modulated signal light is inputted and the optical fiber 106 to which radiation light generated at the Y-shaped recombining portion $Q_2$ of the light waveguide 104 is inputted are spaced only about 80 $\mu$m apart so that fabrication of the optical modulator 100 of a Mach-Zehnder type is difficult.

SUMMARY OF THE INVENTION

In the light of the above disadvantages, an object of the present invention is to provide an optical modulator which can stably modulate light by preventing degradation of the extinction ratio of signal light due to a shift of the operating point of the optical modulator without necessity of aligning the optical fiber used for monitoring, while facilitating a design of the mechanism.

The present invention therefore provides an optical modulator comprising a substrate having electooptic effect, an optical waveguide of a Mach-Zehnder type formed on the substrate, an electrode formed on the substrate to control light propagated in the optical waveguide, an interference light generating means for making radiation light radiated from the optical waveguide and signal light leaking from the optical waveguide interfere with each other to generate interference light and outputting the interference light from an end surface of the substrate, a photo-detector for monitoring the interference light of the radiation light and the signal light obtained by the interference light generating means, and a signal controlling circuit for varying direct-current bias to be applied to the electrode according to a change of the interference light monitored by the photo-detector to control an operating point of the optical modulator.

In the optical modulator according to this invention, a phase and an intensity of the interference light are set such that the interference light is emitted to a position separated by a desired distance from an optical waveguide end position on an end surface of the substrate.

In order to set the phase and the intensity of the interference light, an intensity of the signal light emitted from a recombining portion of the optical waveguide may be adjusted. In order to adjust the intensity of the signal light emitted from the recombining portion of the optical waveguide, a diffusion condition used when the optical waveguide is fabricated may be set.

In order to set the phase and the intensity of the interference light, a length from the recombining portion of the optical waveguide to the optical waveguide end position may be adjusted.

In the optical modulator according to this invention, the interference light may be such set as to have the same phase as the signal light or an inverted phase of the signal light.

In the optical modulator according to this invention, the photo-detector may be disposed between the end surface of the substrate and a lens disposed in a front stage of an optical fiber for outputting, or in a rear stage of the end surface of the substrate to which the optical fiber for outputting is coupled.

In the optical modulator according to this invention, the photo-detector may be disposed in a position separated by a predetermined distance from the end surface of the substrate, or in a position separated by a predetermined distance from the optical waveguide end position on the end surface of the substrate.

In the optical modulator according to this invention, the photo-detector is formed by disposing a photo-detecting element on a plate member. At this time, the plate member may be a ceramic substrate, or a bear chip.

In the optical modulator according to this invention, the substrate may alternatively be a lithium niobate substrate.

The optical modulator according to this invention generates the interference light by making the radiation light radiated from the optical waveguide and the signal light leaking from the optical waveguide interfere with each other, emits the interference light from the end surface of the substrate, and monitors the interference light of the above radiation light and the signal light by the photo-detector. Therefore, it becomes unnecessary to provide an optical fiber for monitoring, and thus unnecessary to align the optical fiber for monitoring. This feature facilitates a design of the mechanism of the optical modulator.

As above, this invention enables operating point control in the optical modulator while facilitating a design of the mechanism of the optical modulator. it is therefore possible to prevent degradation of the extinction ratio of the signal light due to a shift of the operating point of the optical modulator so as to allow stable optical modulation.

By setting the phase and the intensity of the interference light such that the interference light is emitted to a position separated by a desired distance from the optical waveguide end position on the end surface of the substrate, it is possible to dispose the optical fiber to which modulated signal light is inputted and the photo-detector receiving the interference light a desired distance apart. This feature facilitates fabrication of the optical modulator.

At this time, the interference light may be such set as to have the same phase as the signal light, or an inverted phase of the signal light so that a degree of freedom in designing the optical modulator is increased.

By disposing the photo-detector in a position separated by a predetermined distance from the end surface of the substrate, it is possible to widen a radiation region of the interference light radiated from the end surface on an outputting side of the substrate.

By disposing the photo-detector in a position separated by a predetermined distance from the optical waveguide end position on the end surface of the substrate, it is possible to prevent the signal light to be inputted to an optical fiber from an output waveguide of the optical waveguide from being blocked.

The present invention also provides an optical modulator comprising a substrate having electrooptic effect, an optical waveguide of a Mach-Zehnder type formed on the substrate, an electrode formed on the substrate to control light propagated in the optical waveguide, and an interference light generating means for making radiation light radiated from the optical waveguide and signal light leaking from the optical waveguide interfere with each other to generate interference light, and emitting the interference light from an end surface of the substrate.

In the optical modulator according to this invention, the optical fiber to which modulated signal light is inputted and the photo-detector receiving the interference light may be disposed a desired distance apart by emitting the interference light from the end surface of the substrate. This feature facilitates fabrication of the optical modulator.

The present invention also provides an optical modulator including a substrate having electrooptic effect, an optical waveguide formed on said substrate and an electrode formed on said substrate to control light propagated in said optical waveguide, comprising a photo-detector for monitoring interference light of radiation light and signal light emitted from an end surface of said substrate, and a signal controlling circuit for varying direct-current bias to be applied to said electrode according to a change of the interference light monitored by said photo-detector to control an operating point of the optical modulator.

The optical modulator according to this invention may control the operating point of the optical modulator by monitoring the interference light of the radiation light and the signal light emitted from the end surface of the substrate. It is therefore possible to prevent degradation of the extinction ratio of the signal light due to a shift of the operating point of the optical modulator to allow stable optical modulation, while facilitating a design of the mechanism of the optical modulator.

BRIEF DESCRIPTION OF THE DRAWINGS

FIG. 6 is a diagram for illustrating setting of a phase of interference light in the optical modulator according to the embodiment of this invention;

DESCRIPTION OF THE PREFERRED EMBODIMENTS

Hereinafter, embodiments of this invention will be described with reference to the drawings.

(a) Description of an embodiment of the invention

Figure 1:
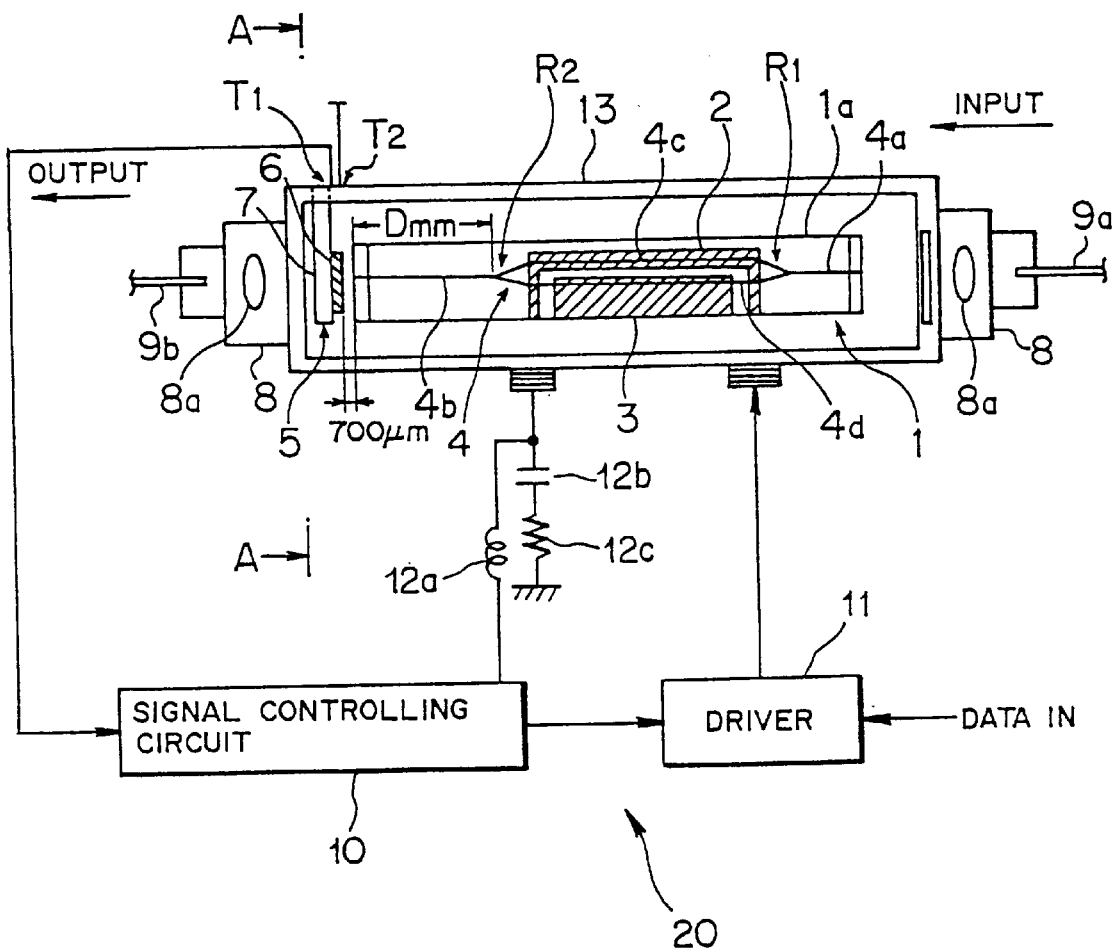
FIG. 1 is a schematic view of an optical modulator according to an embodiment of this invention.

FIG. 1 is a schematic view of an optical modulator according to an embodiment of this invention.

The optical modulator shown in FIG. 1 is an optical modulator of a Mach-Zehnder type in a system coupled via lenses, which is used as an external optical modulator for modulating light emitted from a signal light source such as a semiconductor laser or the like in, for example, a transmitting unit in an ultra high-speed optical communication system.

Figure 2:
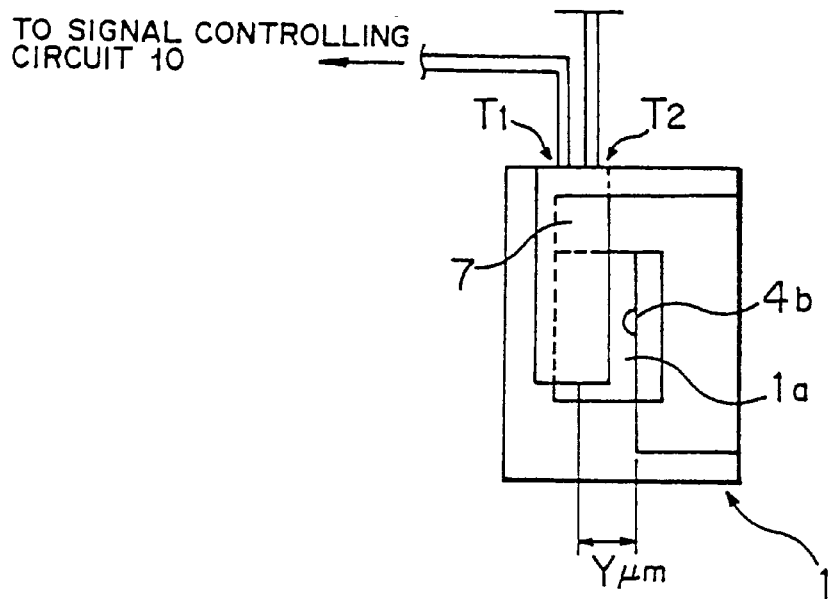
FIG. 2 is a sectional view of the optical modulator shown in FIG. 1 taken along line A—A.
Figure 3:
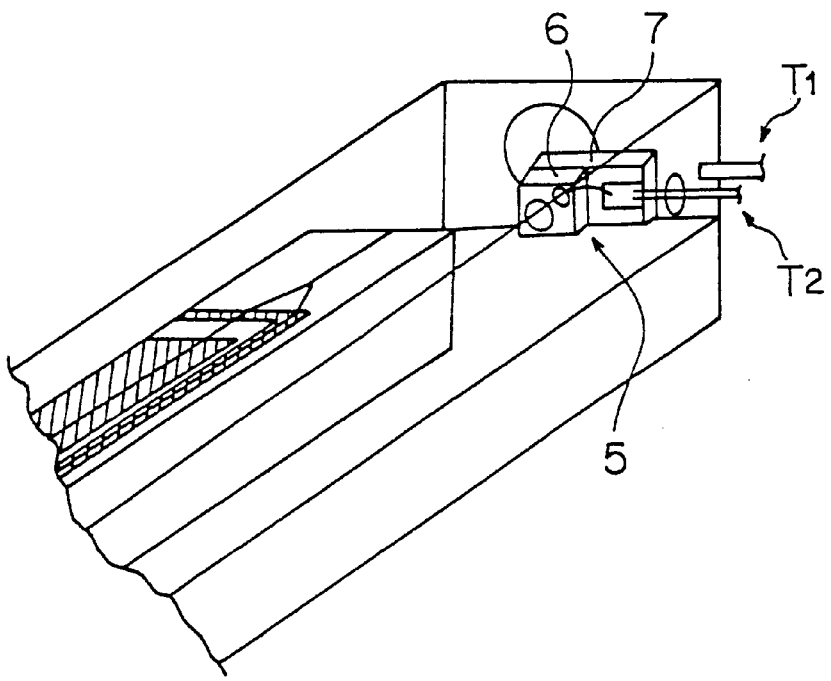
FIG. 3 is a perspective view of the optical modulator shown in FIG. 1 looking into an emitting side from an inputting side thereof.

FIG. 2 is a sectional view of the optical modulator 20 of a Mach-Zehnder type shown in FIG. 1 taken along line A—A. FIG. 3 is a perspective view of the optical modulator 20 of a Mach-Zehnder type shown in FIG. 1, looking into an emitting side from an inputting side thereof.

Figure 4A:
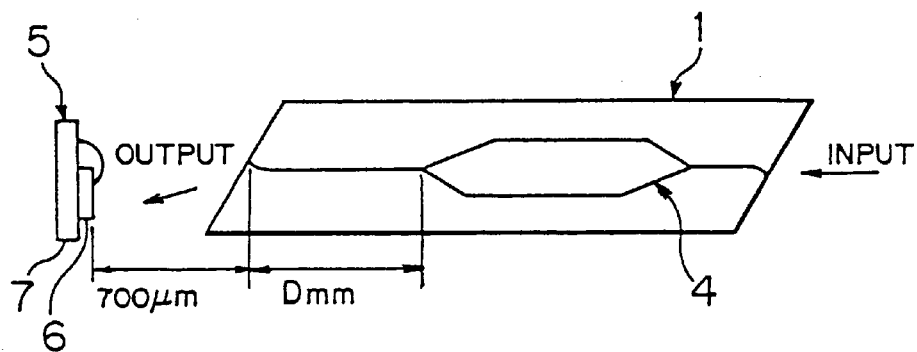
FIGS. 4(a) and 4(b) are diagrams for illustrating a position in which a photo-detector is disposed.
Figure 4B:
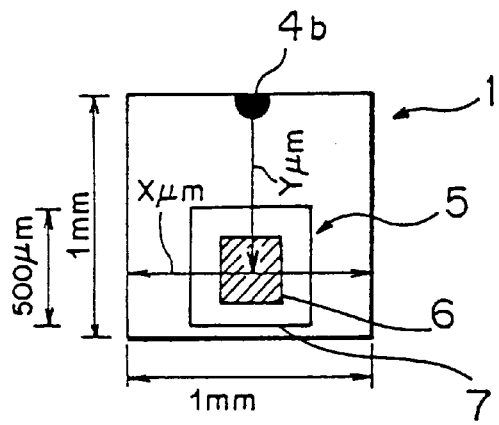
Figure 5:
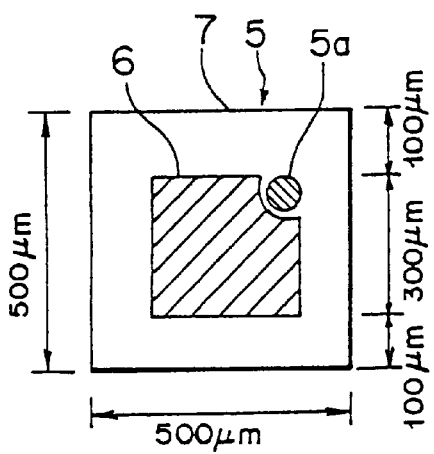
FIG. 5 is a diagram showing the photo-detector shown in FIG. 4(b)

FIGS. 4(a) and 4(b) are diagrams for illustrating a position in which a photo-detector 5 is disposed. FIG. 5 is a diagram showing the photo-detector 5 shown in FIG. 4(b).

Figure 7:
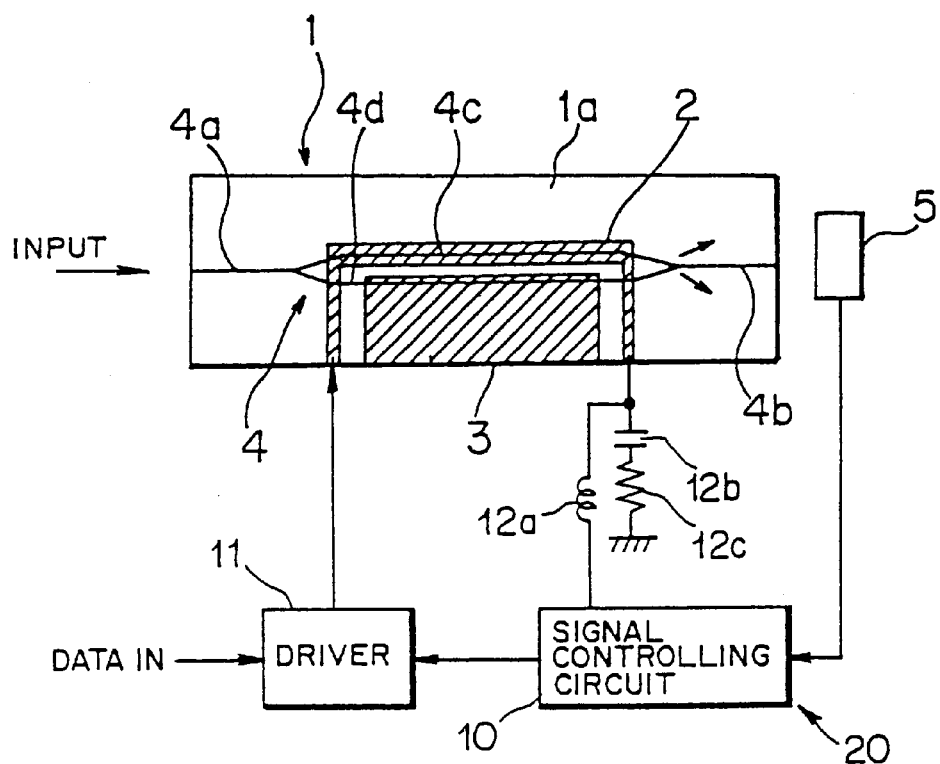
FIG. 7 is a schematic view of an essential structure of the optical modulator according to the embodiment of this invention.
Figure 8:
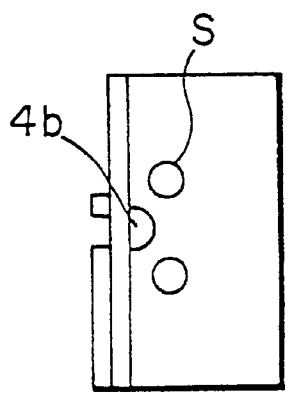
FIG. 8 is a side view of an emitting side of an optical waveguide device of a Mach-Zehnder type in the optical modulator shown in FIG. 7.

FIG. 7 is a schematic view of an essential part of the optical modulator 20 of a Mach-Zehnder type shown in FIG. 1. FIG. 8 is a side view of an outputting side of an optical waveguide device 1 of a Mach-Zehnder type shown in FIG. 7.

As shown in FIG. 1, the optical modulator 20 of a Mach-Zehnder type has a package 13 in which the optical waveguide device 1 of a Mach-Zehnder type and the photo-detector 5 are incorporated, a driver 11 as an input signal source, and a signal controlling circuit (ABC circuit; automatic bias control circuit) 10.

To an inputting side and an outputting side of the package 13, optical fibers 9a and 9b are connected via lens holders 8 each having a lens 8a used to improve the condensation, respectively.

Incidentally, the driver 11 receives pilot signal from the signal controlling circuit 10 to input data components in an inputted electric signal to the optical waveguide device 1 of a Mach-Zehnder type. Reference numeral 12a denotes an inductor, reference numeral 12b denotes a capacitor and reference numeral 12c denotes a 50Ω terminating resistor.

An optical waveguide 4 of a Mach-Zehnder type is formed on a substrate 1a, then a travelling-wave electrode 2 and a grounding electrode 3 are formed on the optical waveguide 4, whereby the optical waveguide device 1 of a Mach-Zehnder type is formed.

The substrate 1a is a lithium niobate (LiNbO$_3$) substrate (Z-cut substrate) having electrooptic effect.

The optical waveguide 4 of a Mach-Zehnder type has an input waveguide 4a, an output waveguide 4b and intermediate waveguides 4c and 4d (subwaveguides). The intermediate waveguides 4c and 4d are arranged in parallel and connected to the input waveguide 4a and the output waveguide 4b via a Y-shaped splitting portion R$_1$ and Y-shaped recombining portion R$_2$.

Direct-current light from a semiconductor laser (not shown) is inputted to the input waveguide 4a of the optical waveguide 4 through the optical fiber 9a connected to the package 13, and modulated signal light is outputted from the output waveguide 4b of the optical waveguide 4 to the optical fiber 9b connected to the package 13.

Incidentally, the optical fiber 9a is a constant polarization fiber, whereas the optical fiber 9b is a single-mode fiber.

A metal such as titanium (Ti) or the like 1000 Å in thick is evaporated on a surface of the lithium niobate (LiNbO$_3$) substrate 1a, a pattern is formed by photolithography and etching, and left for 8 hours in oxygen (WetO$_2$) at a high temperature of, for example, 1000° C. to diffuse the metal such as Ti or the like in the substrate 1a, whereby the optical waveguide 4 is formed.

Namely, a metal such as Ti or the like is selectively diffused in only a part corresponding to the optical waveguide 4 of the substrate 1a so that the part has a larger refractive index than another part, whereby the optical waveguide 4 is formed.

On the optical waveguide 4, a buffer layer (not shown) formed by a thin film consisting of silicon dioxide (SiO$_2$) or the like is formed in order to decrease absorption of light by a metal electrode layer (the travelling-wave electrode 2 and the grounding electrode 3) on the optical waveguide 4.

To the buffer layer not shown, a coating (Si coat) is applied by depositing silicon (Si), although not shown, in order to improve stability of temperature of the optical waveguide device 1 of a Mach-Zehnder type.

The travelling-wave electrode 2 and the grounding electrode 3 are used to control light propagated in the optical waveguide 4, which are formed by evaporating a metal such as gold (Au) or the like on the intermediate waveguides 4c and 4d of the optical waveguide 4.

The travelling-wave electrode 2 and the grounding electrode 3 are connected to the input signal source 11. The travelling-wave electrode 2 and the grounding electrode 3 have applied thereto a voltage according to an input signal (modulating wave signal) from the input signal source 11 to vary a refractive index of the intermediate waveguides 4c and 4d as will be described later, thereby modulating direct-current light inputted from the semiconductor laser (not shown) through the optical fiber 9a.

The direct-current light from the semiconductor laser is modulated by the travelling-wave electrode 2 and the grounding electrode 3, then outputted as signal light (main signal light) or radiation light from the Y-shaped recombining portion R$_2$ of the optical waveguide 4.

Figure 9:
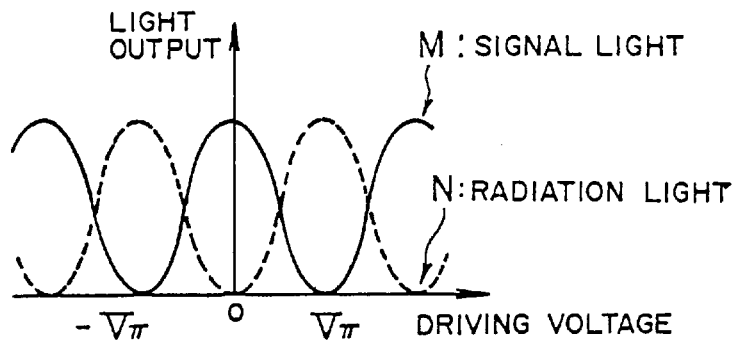
FIG. 9 is a diagram for illustrating signal light and radiation light.

The signal light and the radiation light have inverse phases, as shown in FIG. 9. The signal light and the radiation light have periodicity to a driving voltage. In FIG. 9, the signal light is indicated by a reference character M, whereas the radiation light is indicated by a reference character N.

Figure 10A:
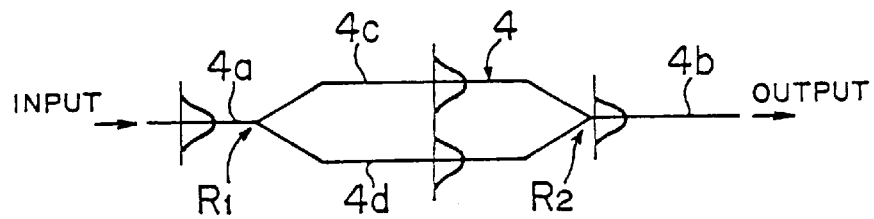
FIGS. 10(a) and 10(b) are diagrams for illustrating the signal light and the radiation light, respectively.
Figure 10B:
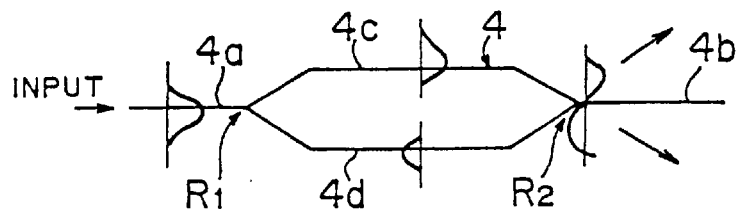

FIGS. 10(a) and 10(b) schematically show the optical waveguide 4 of the optical waveguide device 1 of a Mach-Zehnder type.

FIG. 10(a) shows a state of light propagation where no voltage is applied, whereas FIG. 10(b) shows a state of light propagation where a voltage is applied.

In each of FIGS. 10(a) and 10(b), a propagation mode is shown as a wave-like pattern in each of the waveguides (the input waveguide 4a, the output waveguide 4b and the intermediate waveguides 4c and 4d) of the optical waveguide 4.

In FIG. 10(a), the direct-current light from the semiconductor laser not shown is split by the Y-shaped splitting portion $R_1$ when inputted to the input waveguide 4a in a predetermined input mode, inputted to the intermediate waveguides 4c and 4d, propagated in the intermediate waveguides 4c and 4d in the same mode as the input mode, recombined at the Y-shaped recombining portion $R_2$, and outputted from the output waveguide 4b in the same mode.

In FIG. 10(b), the direct-current light from the semiconductor laser not shown is split by the Y-shaped splitting portion $R_1$ when inputted to the input waveguide 4a in a predetermined input mode, then inputted to the intermediate waveguides 4c and 4d. In this case, since a refractive index of the intermediate waveguides 4c and 4d is changed because of an applied voltage, a propagation velocity of the light is changed.

Therefore, a phase difference is generated in the lights propagated in the intermediate waveguides 4c and 4d. When the lights having different phases are recombined at the Y-shaped recombining portion $R_2$, a mode of light that should be inputted to the output waveguide 4b differs from the input mode.

For this, the light reaching the Y-shaped recombining portion $R_2$ cannot be outputted to the output waveguide 4b, and is thus radiated as radiation light to the inside of the substrate 1a. Incidentally, the radiation light is emitted to a position indicated by a reference character S in FIG. 8, for example.

Actually, the signal light slightly leaks to the inside of the substrate 1a. For this, the leaking signal light and the radiation light interfere with each other in the vicinity of the Y-shaped recombining portion $R_2$ inside the substrate 1a so that interference light is generated.

The signal light outputted to the output waveguide 4b from the Y-shaped recombining portion $R_2$ also slightly leaks to the inside of the substrate 1a when propagated in the output waveguide 4b. For this, the leaking signal light and the radiation light interfere with each other in the vicinity of the output waveguide 4b inside the substrate 4a so that interference light is generated as well.

The interference light generated as above is propagated inside the substrate 1a, and emitted from an end surface on the outputting side of the substrate 1a.

Namely, the Y-shaped recombining portion $R_2$ and the substrate 1a in the vicinity of the Y-shaped recombining portion $R_2$ or the output waveguide 4b and the substrate 1a in the vicinity of the output waveguide 4b function as an interference light generating means for generating interference light.

As shown in FIG. 1, the photo-detector 5 is disposed in the rear stage of the end surface on the outputting side of the substrate 1a, and the signal controlling circuit 10 is connected to a terminal $T_1$ of the photo-detector 5. Incidentally, a terminal $T_2$ of the photo-detector 5 is grounded.

In concrete, the photo-detector 5 is interposed, within the package 13, between the lens 8a arranged in the front stage of the optical fiber 9b for outputting and the end surface on the outputting side of the substrate 1a of the optical waveguide device 1 of a Mach-Zehnder type, as shown in FIG. 1.

As shown in FIGS. 1 through 3, the photo-detector 5 is formed by placing a bear chip 6 as a photo-detecting element on a ceramic substrate 7. The photo-detector 5 receives the interference light emitted from the end surface on the outputting side of the substrate 1a, converts the received interference light into an electric signal, and outputs the electric signal to the signal controlling circuit 10, thereby monitoring the interference light. An example of a size of the photo-detector 5 is shown in FIG. 5. In FIG. 5, reference numeral 5a denotes an electrode.

The signal controlling circuit 10 varies direct-current bias of an input electric signal to be applied to the travelling-wave electrode 2 according to a result of the monitoring by the photo-detector 5 (that is, a change of a light output electric signal from the photo-detector 5).

As stated above, in the optical modulator 20 of a Mach-Zehnder type, an operating point of the optical modulator 20 of a Mach-Zehnder type is generally shifted with time elapsed due to temperature drift, DC drift, stress and the like.

Figure 31:
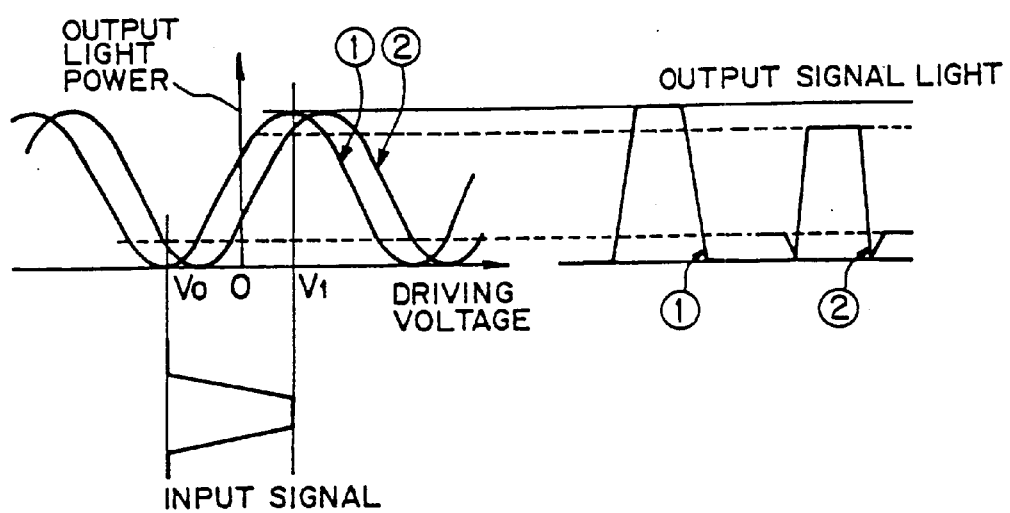
FIG. 31 is a diagram showing an input-output characteristic of the optical modulator of a Mach-Zehnder type.

If optical modulation is conducted in a state where the operating point has been shifted, the extinction ratio is degraded as described before with reference to FIG. 31.

According to this embodiment, the photo-detector monitors the interference light emitted from the end surface on the outputting side of the substrate 1a, and the signal controlling circuit 10 varies direct-current bias of the input electric signal to be applied to the travelling-wave electrode 2 according to a result of the monitoring by the photo-detector 5, whereby the operating point of the optical modulator 20 of a Mach-Zehnder type can be controlled.

In the optical modulator 20 of a Mach-Zehnder type according to this embodiment, a phase of the interference light is set such that the interference light is emitted to a position separated by a desired distance from an optical waveguide end position (an end position of the output waveguide 4b of the optical waveguide 4) on the end surface on the outputting side of the substrate 1a.

In concrete, the photo-detector 5 is disposed in a position several hundreds $\mu$m [this distance is indicated by Y in FIG. 4(b), which is about 550 to 750 $\mu$m, for example] lower than the end position of the output waveguide 4b on the end surface on the outputting side of the substrate 1a in order to prevent the signal light to be inputted to the optical fiber 9b from the output waveguide 4b from being blocked.

The photo-detector 5 is disposed in a position separated by several hundreds $\mu$m from the end surface on the outputting side of the substrate 1a in order to further widen a radiation region of the interference light radiated from the end surface on the outputting side of the substrate 1a, as shown in FIGS. 1 and 4(a). FIGS. 1 and 4(a) show a case where the photo-detector 5 is disposed in a position separated by 700 $\mu$m from the end surface on the outputting side of the substrate 1a.

A phase and an intensity of the interference light is set by adjusting a fabrication condition of the optical waveguide 4.

Namely, the phase and the intensity of the interference light are set by varying a diffusion condition upon fabricating the optical waveguide 4 as the fabrication condition of the optical waveguide 4 so as to adjust a signal light power (signal light intensity) leaking from the Y-shaped recombining portion $R_2$ of the light waveguide 4.

The phase and the intensity of the interference light can be alternatively set by varying a length D of the output waveguide 4b of the optical waveguide 4 [that is, a length D from the Y-shaped recombining portion $R_2$ of the light waveguide 4 to the end surface on the outputting side of the substrate 1a; refer to FIGS. 1 and 4(a)] as the fabrication condition of the optical waveguide 4 so as to adjust the signal light power leaking when the interference light is propagated in the output waveguide 4b.

According to this embodiment, a length of the output waveguide 4b is set to, for example, 4.5 mm or more in order to allow the interference light to be radiated on the entire of the end surface on the outputting side of the substrate 1a.

In setting the diffusion condition and designing the length D of the output waveguide 4b when the optical waveguide 4 is fabricated, the interference light is arbitrarily set such as to have the same phase as the signal light or an inverted phase of the signal light.

In the optical modulator 20 of a Mach-Zehnder type with the above structure according to this embodiment, when direct-current light from the semiconductor laser not shown is inputted to the package 13 through the optical fiber 9a, the incident light is inputted to the optical waveguide 4 of the optical waveguide device 1 of a Mach-Zehnder type.

In the optical waveguide device 1 of a Mach-Zehnder type, the light inputted from the input waveguide 4a is split by the Y-shaped splitting portion $R_1$, modulated by the travelling-wave electrode 2 and the grounding electrode 3 while being propagated in the intermediate waveguides 4c and 4d, then the modulated lights are recombined by the Y-shaped recombining portion of the optical waveguide 4.

Whereby, signal light and radiation light are generated at the Y-shaped recombining portion $R_2$, and the signal light is outputted from the output waveguide 4b, whereas the radiation light is radiated to the inside of the substrate 1a from the Y-shaped recombining portion $R_2$.

On the other hand, the signal light and the radiation light leaking from the Y-shaped recombining portion $R_2$ interfere with each other in the vicinity of the Y-shaped recombining portion $R_2$ inside the substrate 1a so that interference light is generated. In the vicinity of the output waveguide 4b inside the substrate 1a, the signal light and the radiation light leaking from the output waveguide 4b interfere with each other so that interference light is generated.

The interference light generated as above is emitted from the end surface on the outputting side of the substrate 1a.

Since the phase of the interference light is set by adjusting the fabrication condition of the optical waveguide 4 as described before in the optical modulator 20 of a Mach-Zehnder type according to this embodiment, the interference light is emitted to a position separated by a desired distance from the end position of the output waveguide 4b on the end surface on the outputting side of the substrate 1a.

The emitted interference light is received by the photo-detector 5 disposed in the relevant position. The photo-detector 5 converts the received interference light into an electric signal, and outputs the electric signal to the signal controlling circuit 10.

As a result, the signal controlling circuit 10 varies direct-current bias of the input electric signal to be applied to the travelling-wave electrode 2 according to a change of the light output electric signal from the photo-detector 5, thereby controlling the operating point of the optical modulator 20 of a Mach-Zehnder type.

The signal light outputted from the output waveguide 4b of the optical waveguide device 1 of a Mach-Zehnder type is outputted to the optical fiber 9b connected to the package 13 via the lens 8a.

Next, setting of the phase of the interference light by adjusting the fabrication condition of the optical waveguide 4 will be explained with reference to FIG. 6.

FIG. 6 shows fabrication conditions [refer to (1) through (4)] of the optical waveguide 4 and phases, etc. of the interference light generated in the respective condition.

FIGS. 11, 14, 17 and 20 are diagrams showing power distribution of the signal light, FIGS. 12, 15, 18 and 21 are diagrams showing power distribution of the radiation light, and FIGS. 13, 16, 19 and 22 are diagrams showing phase distribution of the interference light.

In FIGS. 11 through 22, X [μm] entered along the horizontal axis and Y [μm] entered along the vertical axis correspond to X and Y (Y corresponds to the distance Y mentioned above), respectively, shown in FIG. 4(b).

In FIGS. 11 through 22, in order to show that the distance Y mentioned above is a length in the downward direction from the end position of the output waveguide 4b on the end surface on the outputting side of the substrate 1a, negative numeral values are assigned to Y entered along the vertical axis.

As to X entered along the horizontal axis, the end position of the output waveguide 4b on the end surface on the outputting side of the substrate 1a is indicated by 0, a length in the rightward direction from the end position of the output waveguide 4b is indicated by a positive numeral value, and a length in the leftward direction is indicated by a negative numeral value.

In FIGS. 11 through 22, power distribution of the signal light, power distribution of the radiation light, or phase distribution of the interference light is asymmetric. The reason for this is that the optical waveguide device 1 of a Mach-Zehnder type with the end surface on the outputting side of the substrate 1a obliquely cut when looked from the above is used in order to diminish reflected feedback light of the emitted light [refer to FIG. 4(a)].

Monitored waveforms of an output light power in respective conditions shown in FIG. 6 are shown in FIGS. 23 through 26.

Figure 11:
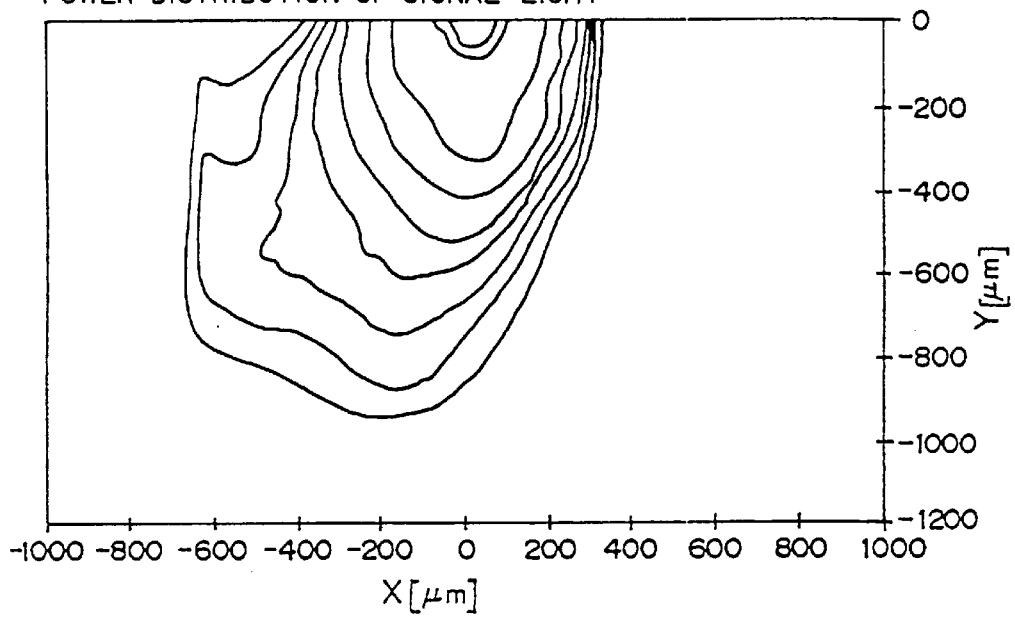
FIG. 11 is a diagram showing power distribution of the signal light in the optical modulator according to the embodiment of this invention.
Figure 12:
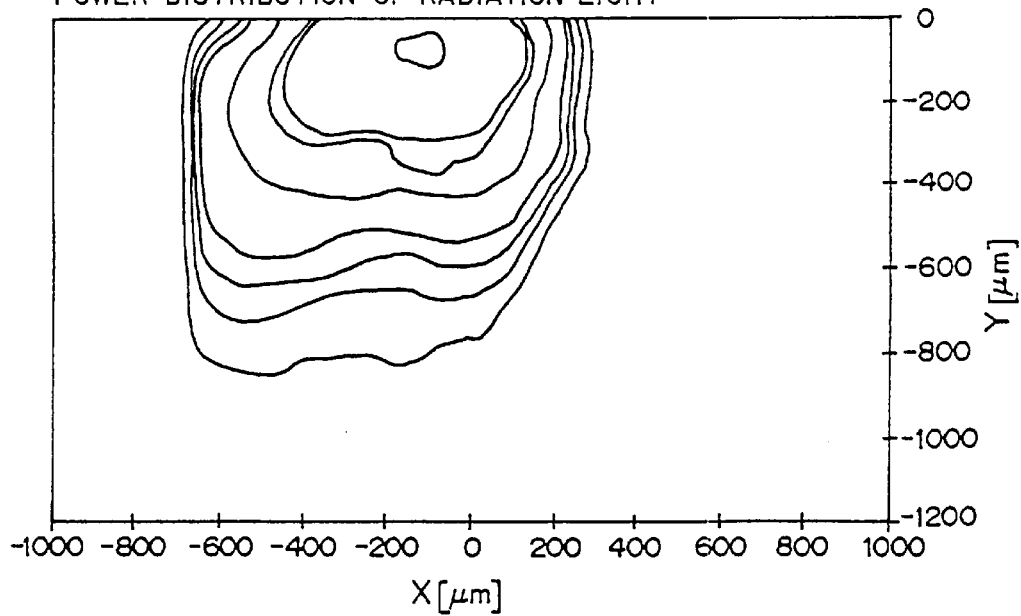
FIG. 12 is a diagram showing power distribution of the radiation light in the optical modulator according to the embodiment of this invention.
Figure 13:
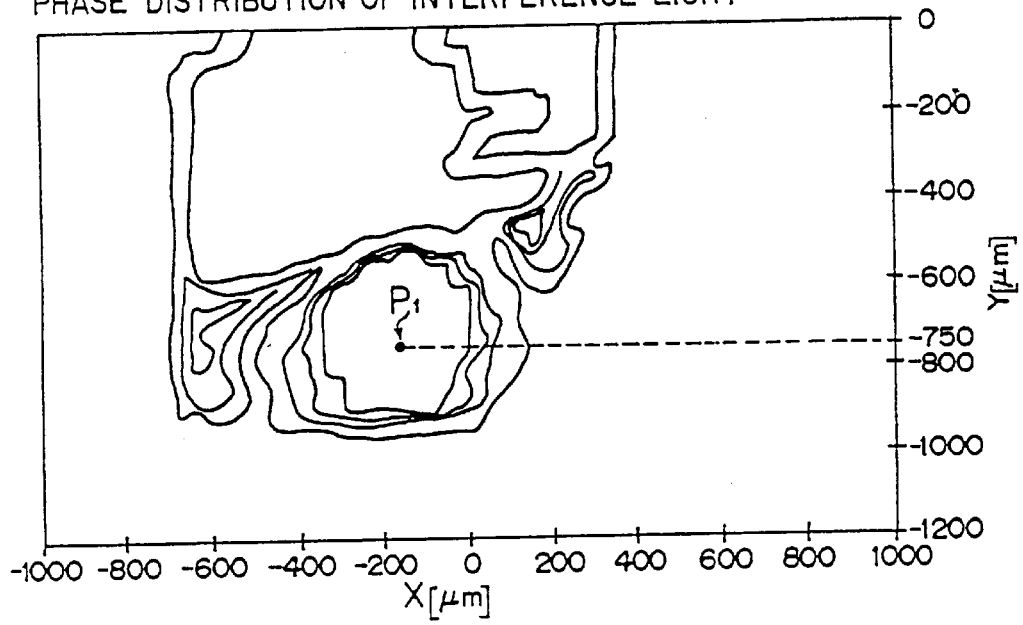
FIG. 13 is a diagram showing phase distribution of the interference light in the optical modulator according to the embodiment of this invention.

(1) In the case where the diffusion condition is 1000° C. and 8 hours, and the length D of the output waveguide 4b of the optical waveguide 4 is 12 mm:

Power distribution of the signal light and power distribution of the radiation light in this case are shown in FIGS. 11 and 12, respectively. From FIGS. 11 and 12, phase distribution of the interference light is as shown in FIG. 13.

In this case, the interference light has the same phase as the signal light. It is seen that the interference light is emitted to a vicinity of a point $P_1$, that is, a position about 750 μm lower than the end position of the output waveguide 4b on the end surface on the outputting side of the substrate 1a, as shown in FIG. 13.

Figure 23:
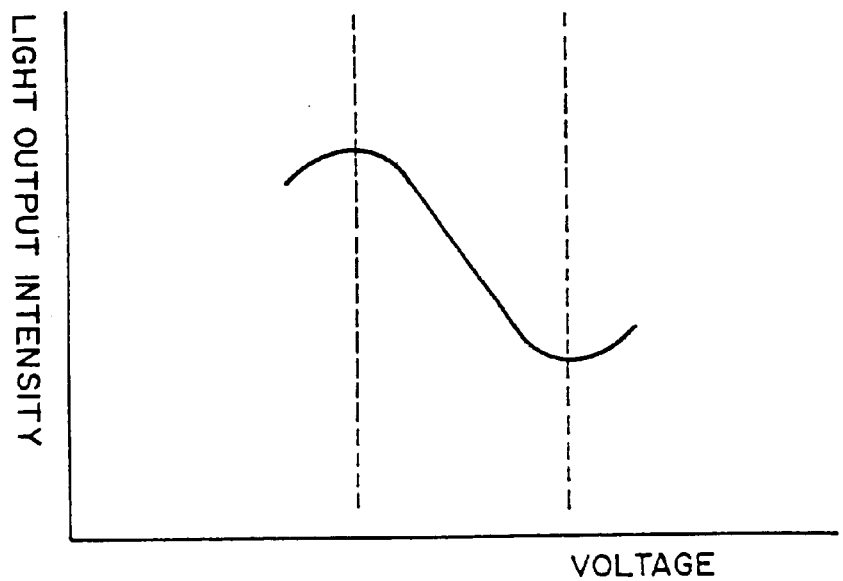
FIG. 23 is a diagram showing an input characteristic of the optical modulator according to the embodiment of this invention.

In this case, by disposing the photo-detector 5 in a position separated by about 750 μm from the optical fiber 9b to which the modulated signal light is inputted, a monitored waveform shown in FIG. 23 can be obtained.

Figure 14:
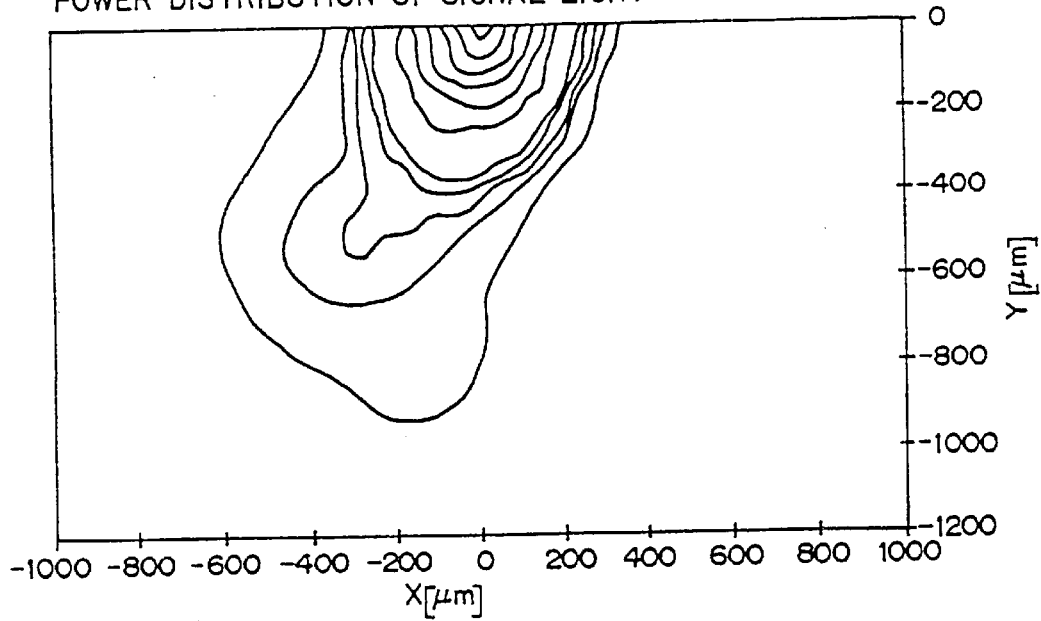
FIG. 14 is a diagram showing power distribution of the signal light in the optical modulator according to the embodiment of this invention.
Figure 15:
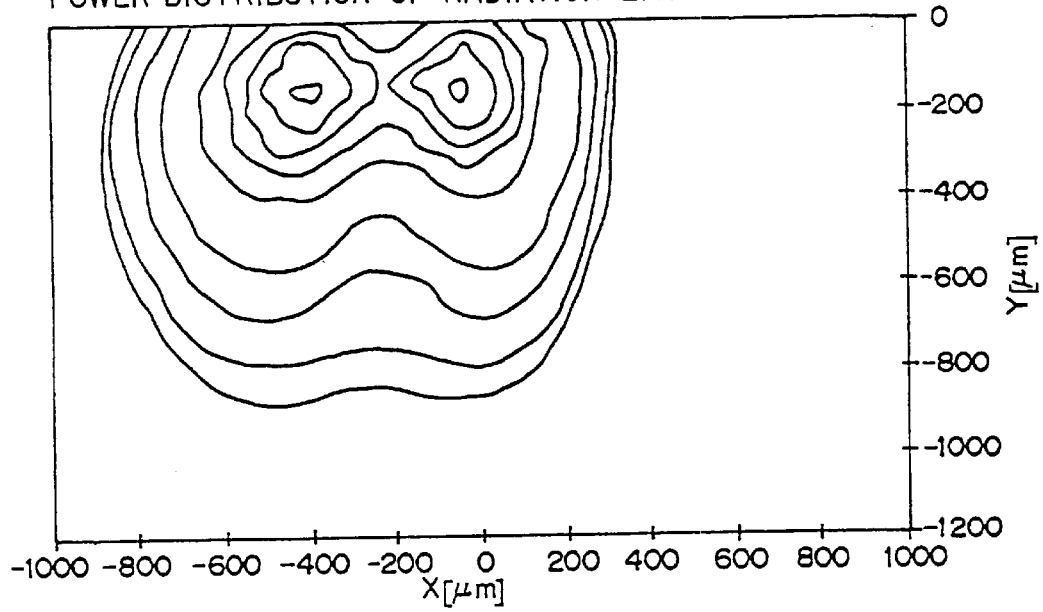
FIG. 15 is a diagram showing power distribution of the radiation light in the optical modulator according to the embodiment of this invention.
Figure 16:
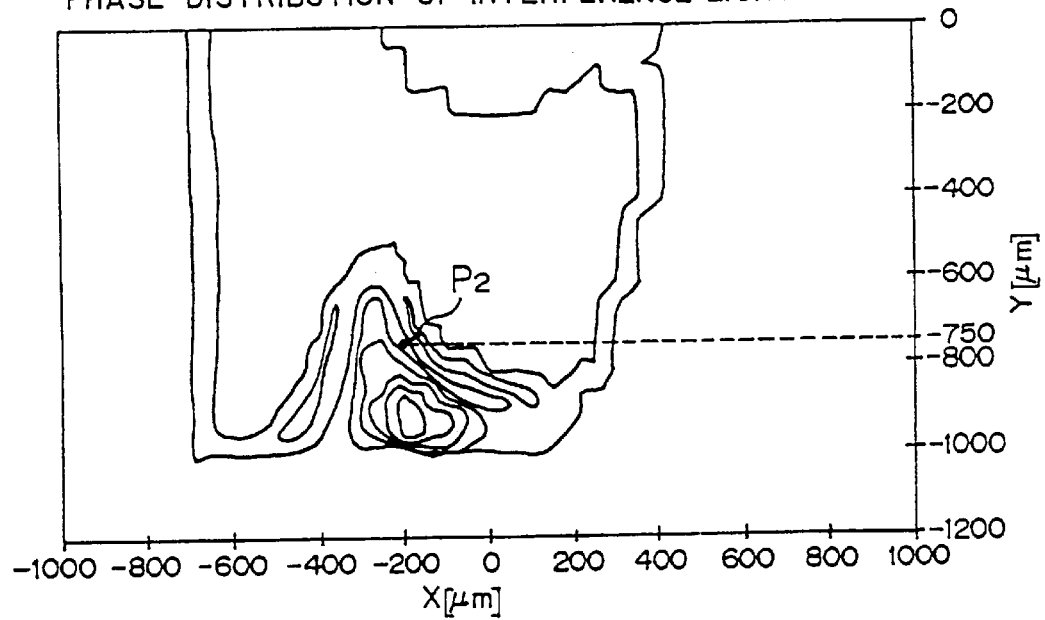
FIG. 16 is a diagram showing phase distribution of the interference light in the optical modulator according to the embodiment of this invention.

(2) In the case where the diffusion condition is 1040° C. and 8 hours, and the length D of the output waveguide 4b of the optical waveguide 4 is 15 mm:

Power distribution of the signal light and power distribution of the radiation light in this case are shown in FIGS. 14 and 15, respectively. From FIGS. 14 and 15, phase distribution of the interference light is as shown in FIG. 16.

In this case, the interference light has an inverted phase of the signal light. The interference light is emitted to a vicinity of a point $P_2$, that is, a position about 750 μm lower than the end position of the output waveguide 4b on the end surface on the outputting side of the substrate 1a, as shown in FIG. 16.

Figure 24:
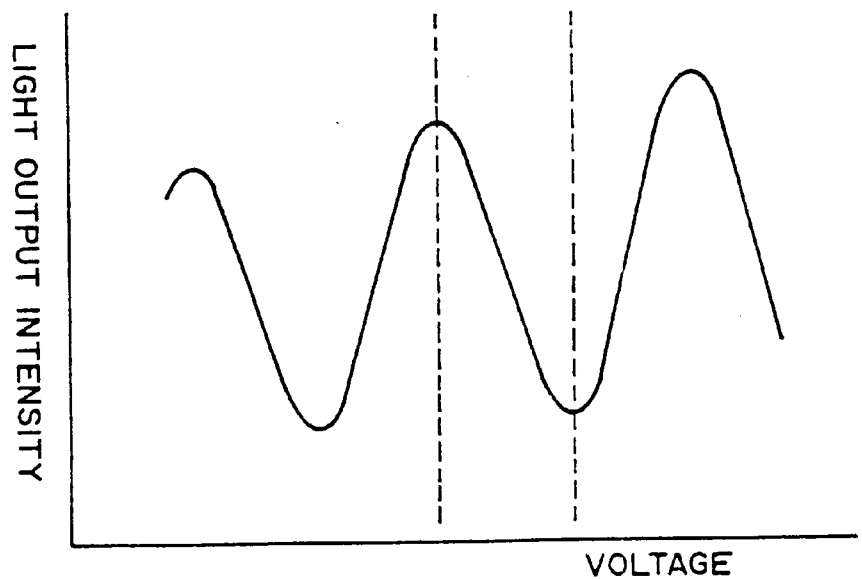
FIG. 24 is a diagram showing the input characteristic of the optical modulator according to the embodiment of this invention.

In this case, by disposing the photo-detector 5 in a position separated by about 750 μm from the optical fiber 9b to which the modulated signal light is inputted, a monitored waveform shown in FIG. 24 can be obtained.

Figure 17:
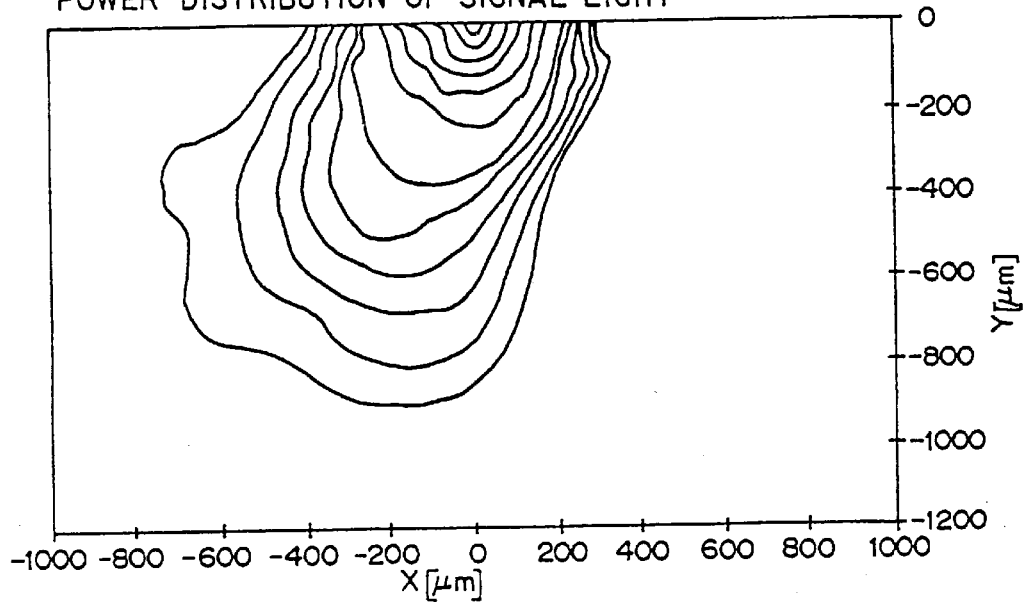
FIG. 17 is a diagram showing power distribution of the signal light in the optical modulator according to the embodiment of this invention.
Figure 18:
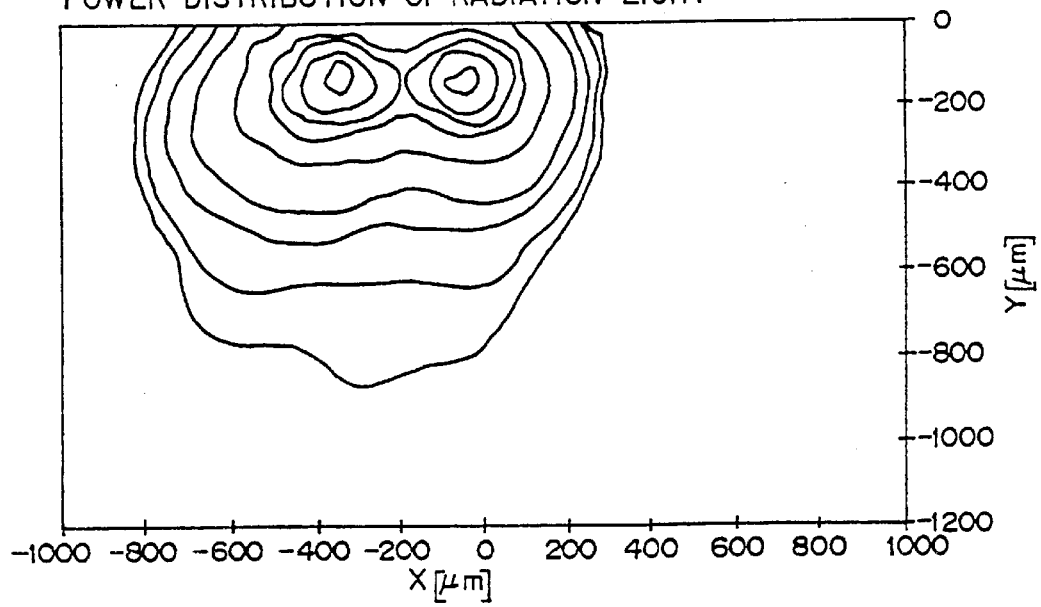
FIG. 18 is a diagram showing power distribution of the radiation light in the optical modulator according to the embodiment of this invention.
Figure 19:
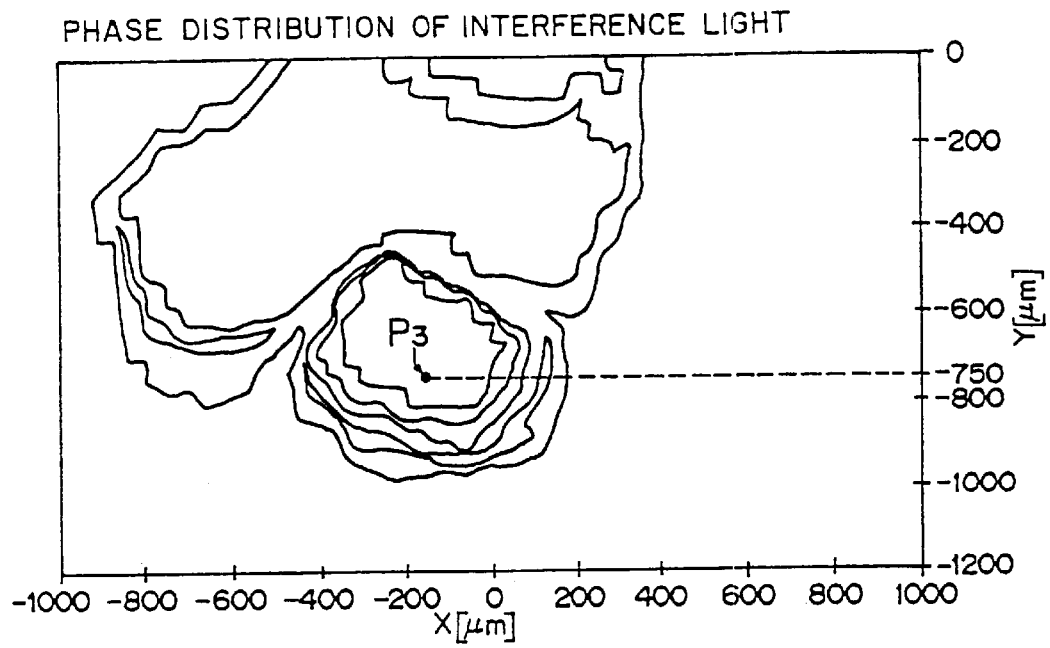
FIG. 19 is a diagram showing phase distribution of the interference light in the optical modulator according to the embodiment of this invention.

(3) In the case where the diffusion condition is 1040° C. and 8 hours, and the length D of the output waveguide 4b of the optical waveguide 4 is 10 mm:

Power distribution of the signal light and power distribution of the radiation light are shown in FIGS. 17 and 18, respectively. From FIGS. 17 and 18, phase distribution of the interference light is as shown in FIG. 19.

In this case, the interference light has the same phase as the signal light. The interference light is emitted to a point $P_3$, that is, a position about 750 µm lower than the end position of the output waveguide 4b on the end surface on the outputting side of the substrate 1a, as shown in FIG. 19.

Figure 25:
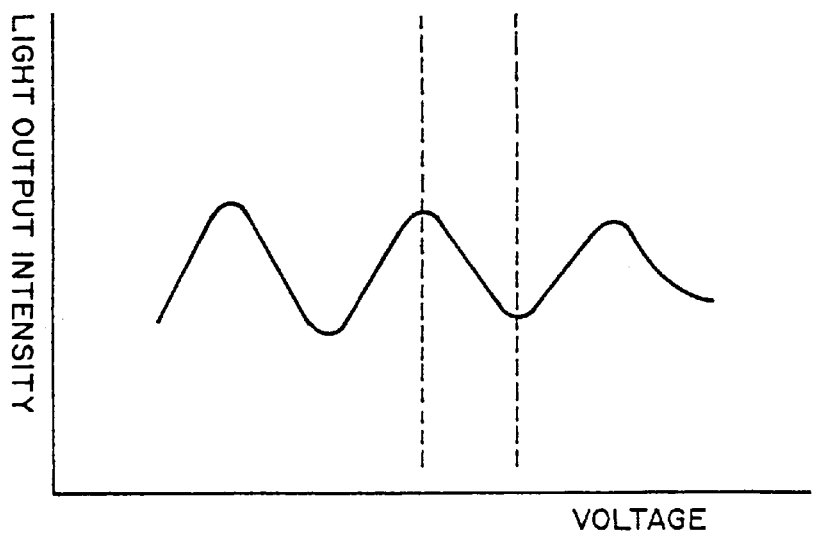
FIG. 25 is a diagram showing the input characteristic of the optical modulator according to the embodiment of this invention.

In this case, by disposing the photo-detector 5 in a position separated by about 750 µm from the optical fiber 9b to which the modulated signal light is inputted, a monitored waveform shown in FIG. 25 can be obtained.

Figure 20:
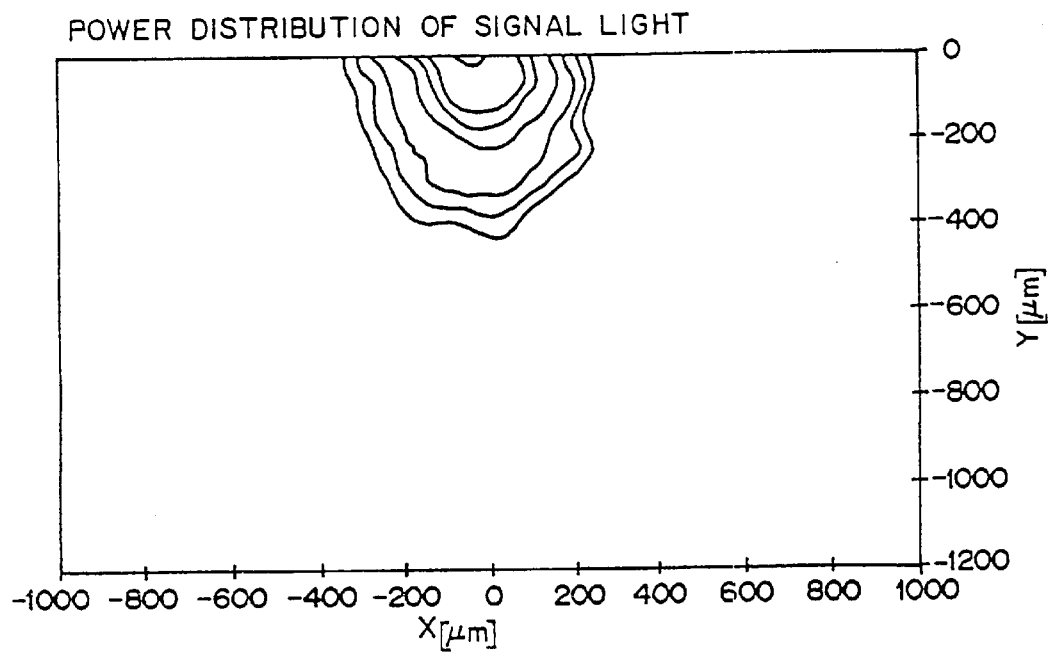
FIG. 20 is a diagram showing power distribution of the signal light in the optical modulator according to the embodiment of this invention.
Figure 21:
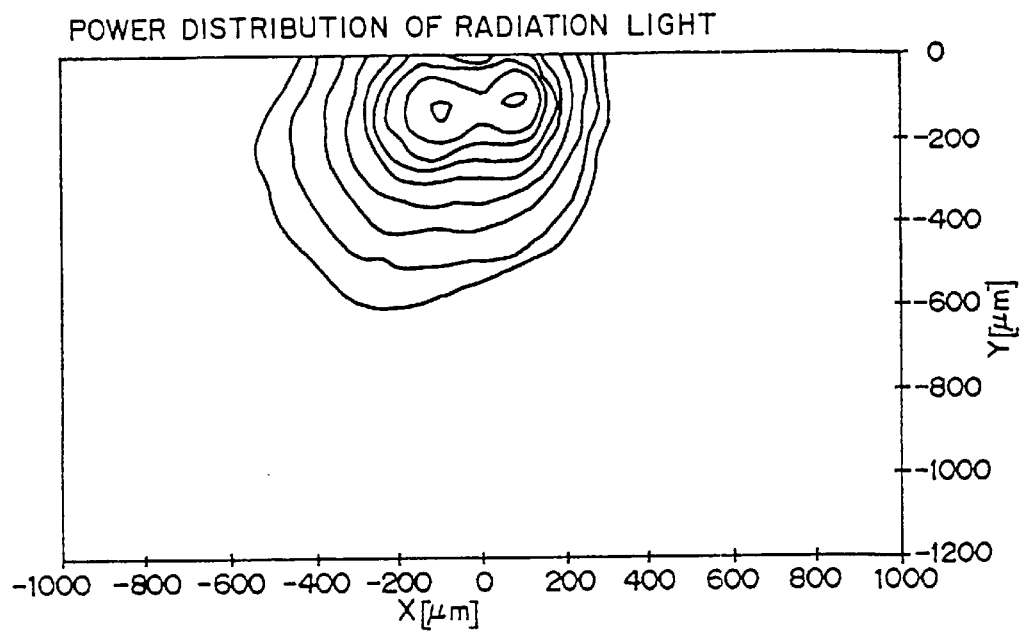
FIG. 21 is a diagram showing power distribution of the radiation light in the optical modulator according to the embodiment of this invention.
Figure 22:
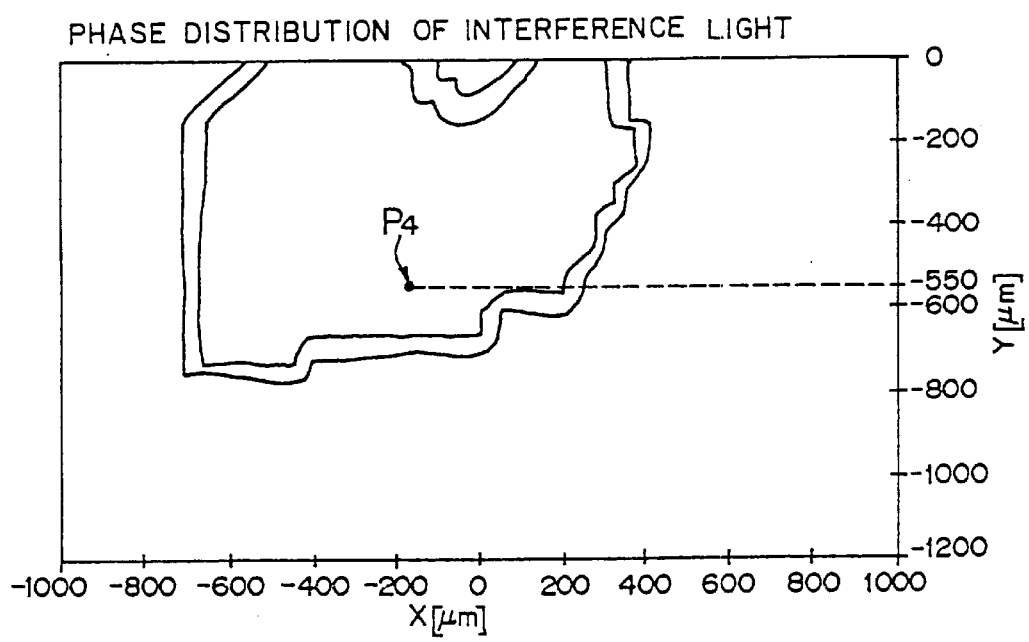
FIG. 22 is a diagram showing phase distribution of the interference light in the optical modulator according to the embodiment of this invention.

(4) In the case where the diffusion condition is 1050° C. and 10 hours, and the length D of the output waveguide 4b of the optical waveguide 4 is 8 mm:

Power distribution of the signal light and power distribution of the radiation light are shown in FIGS. 20 and 21, respectively. From FIGS. 20 and 21, phase distribution of the interference light is as shown in FIG. 22.

In this case, the interference light has an inverted phase of the signal light. The interference light is emitted to the vicinity of a point $P_4$, that is, a position about 550 µm lower than the end position of the output waveguide 4b on the end surface on the outputting side of the substrate 1a, as shown in FIG. 22.

Figure 26:
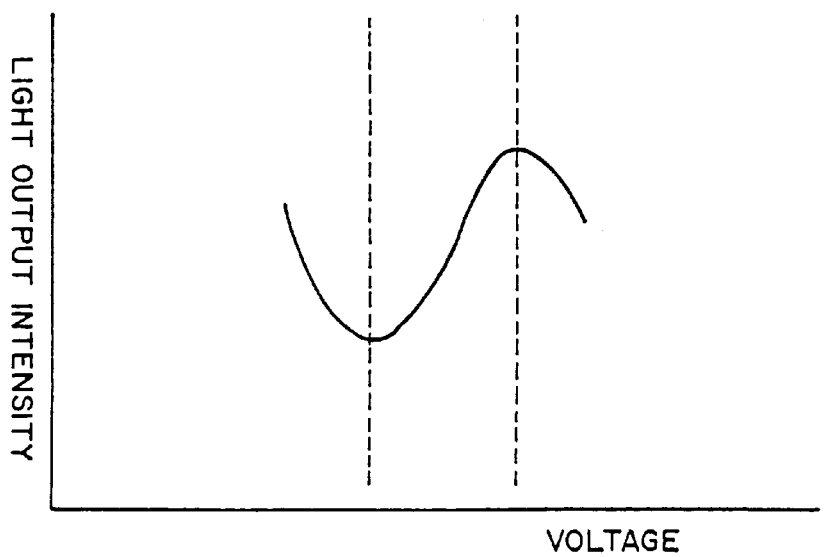
FIG. 26 is a diagram showing the input characteristic of the optical modulator according to the embodiment of this invention.

In this case, by disposing the photo-detector 5 in a position separated by about 550 µm from the optical fiber 9b to which the modulated signal light is inputted, a monitored waveform shown in FIG. 26 can be obtained.

$R_{D\ C}$ and $R_{A\ C}$ shown in FIG. 6 both indicate interference light intensity (monitored light intensity). If an average value of the light output electric signal (current signal) from the photo-detector is $I_{A\ V\ E}$, a difference between a peak value and a bottom value of the light output electric signal is ΔI and an output power from the signal light source not shown is $P_{i\ n}$, $R_{D\ C}$ and $R_{A\ C}$ are defined by the following equations:

$$R_{DC} = I_{A\ V\ E}/P_{i\ n}\ (A/W) \quad ①$$

$$R_{A\ C} = \Delta I/P_{i\ n}\ (A/W) \quad ②$$

By adjusting the interference light intensity such that a ratio of $R_{D\ C}$ to $R_{A\ C}$ is small, that is, by designing the diffusion condition and the length D of the output waveguide 4a of the optical waveguide 4 such that $R_{D\ C}$ is smaller and $R_{A\ C}$ is larger, it is possible to improve the S/N ratio in the signal controlling circuit 10 and stabilize the operating point control of the optical modulator 20 of a Mach-Zehnder type.

Among the above cases (1) through (4), the case (2) is most effective.

Figure 29:
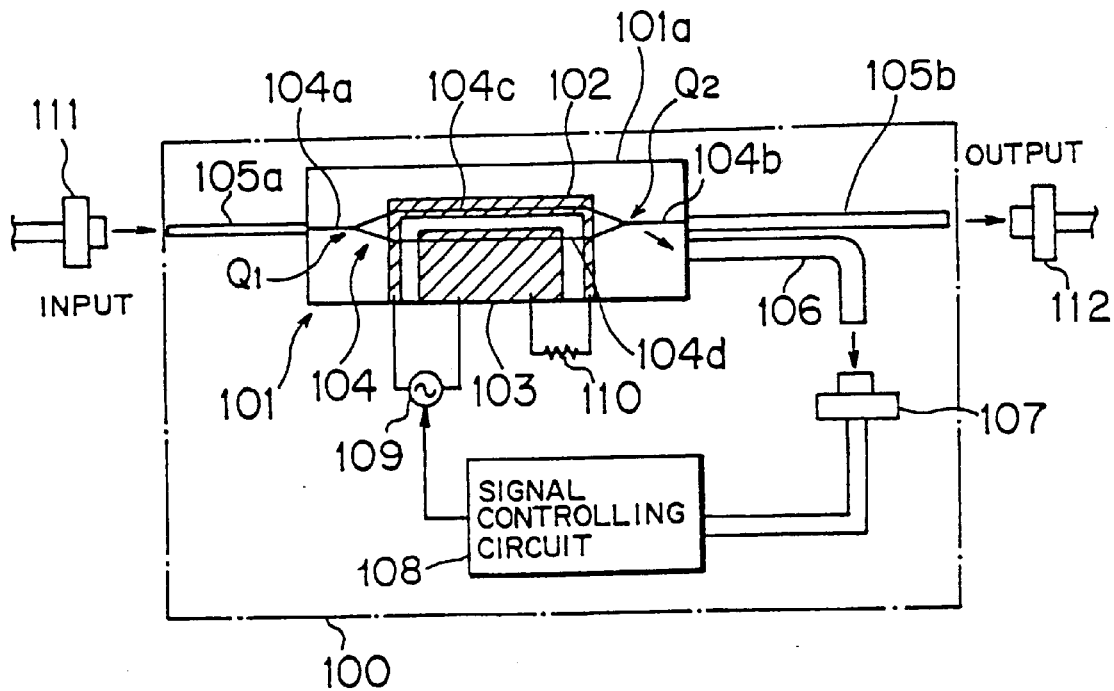
FIG. 29 is a schematic view of an optical modulator of a Mach-Zehnder type.
Figure 30:
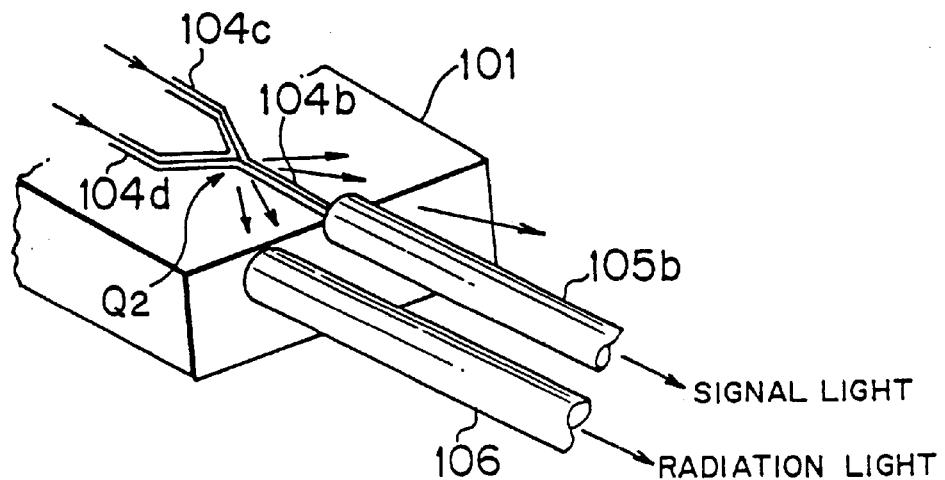
FIG. 30 is a perspective view of the optical modulator of a Mach-Zehnder type shown in FIG. 29 looked from an emitting side thereof.

The optical modulator 20 of a Mach-Zehnder type according to the embodiment of this invention makes the radiation light radiated from the optical waveguide 4 and the signal light leaking from the optical waveguide 4 interfere with each other to generate the interference light, emits the interference light from the end surface of the substrate 1a, and monitors the interference light by the photo-detector 5. In consequence, it becomes unnecessary to provide an optical fiber (refer to reference numeral 106 in FIG. 29) for monitoring, thus unnecessary to align the optical fiber for monitoring. It is therefore possible to readily design the mechanism of the optical modulator 20 of a Mach-Zehnder type.

Since it is possible to control the operating point while facilitating the design of the mechanism of the optical modulator 20 of a Mach-Zehnder type, degradation of the extinction ratio due to shift of the operating point of the optical modulator 20 of Mach-Zehnder type can be prevented so as to allow stable optical modulation.

The phase and the intensity of the interference light are arbitrarily set by adjusting the fabrication condition of the optical waveguide 4 as described before so that the optical fiber 9b to which the modulated signal light is inputted and the photo-detector 5 receiving the interference light can be arranged a desired distance apart. Whereby, it is possible to readily fabricate the optical modulator 20 of a Mach-Zehnder type.

At this time, the interference light may have the same phase as the signal light or an inverted phase of the signal light so that a degree of freedom in design of the optical modulator 20 of a Mach-Zehnder type may be increased.

Further, the photo-detector 5 is disposed in a position a predetermined length (the distance Y) lower than the end position of the output waveguide 4b on the end surface on the outputting side of the substrate 1a, whereby it is possible to prevent the signal light to be inputted from the output waveguide 4b of the optical waveguide 4 to the optical fiber 9b from being blocked.

The photo-detector 5 is disposed in a position separated by several hundreds µm (about 700 mµ, for example) from the end surface on the outputting side of the substrate 1a as shown in FIGS. 1 and 4(a) so that it is possible to widen the radiation region of the interference light radiated from the end surface on the outputting side of the substrate 1a.

If the length D of the output waveguide 4b of the optical waveguide 4 is set to, for example, 4.5 mm or more, it is possible to emit the interference light on the entire of the end surface on the outputting side of the substrate 1a. It is thereby possible to readily monitor the interference light by the photo-detector 5.

By emitting the interference light of the radiation light and the signal light from the end surface of the substrate 1a, the optical fiber 9b to which the modulated signal light is inputted and the photo-detector 5 receiving the interference light may be disposed a desired distance apart. It is thereby possible to readily fabricate the optical modulator 20 of a Mach-Zehnder type.

(b) Description of modification of the embodiment of this invention

Figure 27:
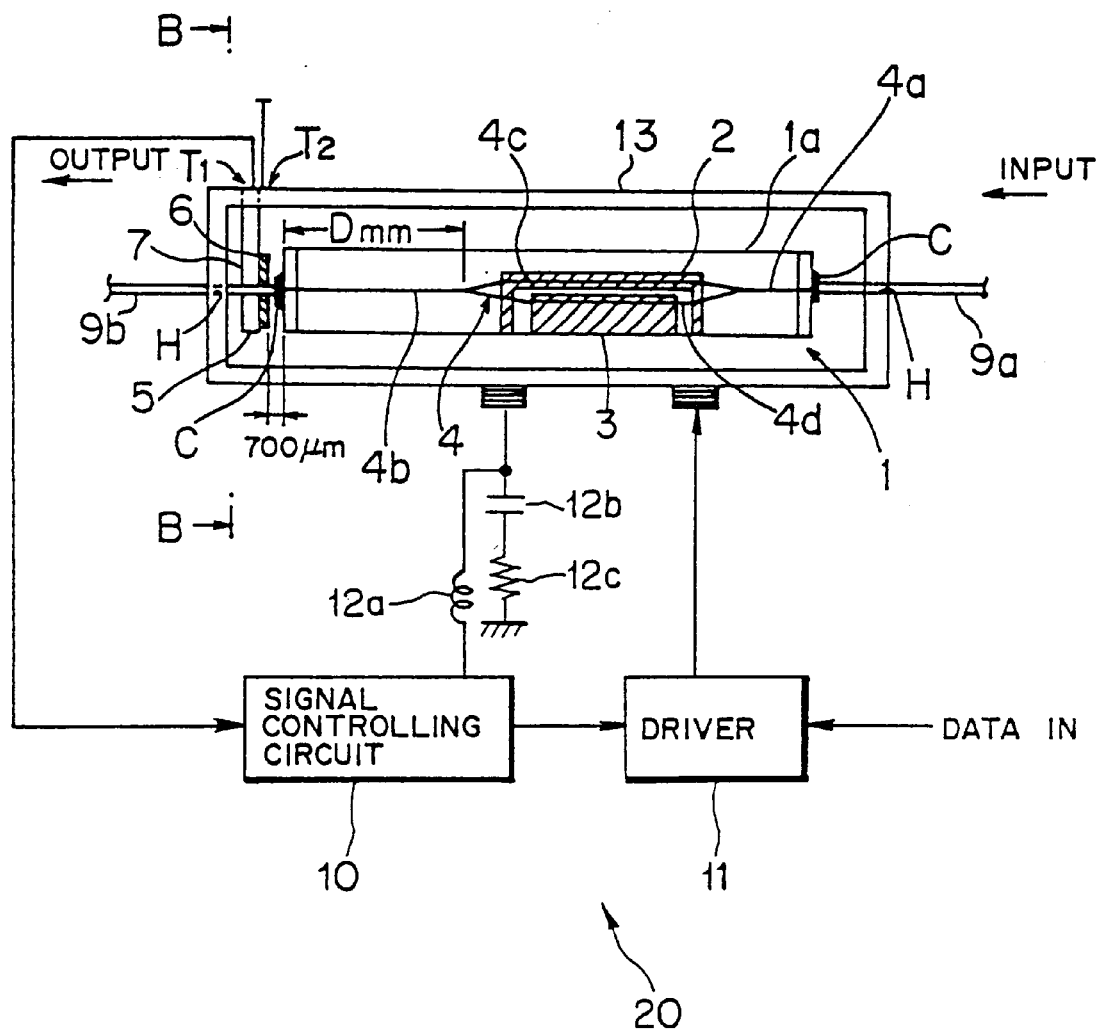
FIG. 27 is a schematic view of an optical modulator according to a modification of the embodiment of this invention.

FIG. 27 is a schematic view of an optical modulator according to a modification of the embodiment of this invention.

The optical modulator shown in FIG. 27 is an optical modulator of a Mach-Zehnder type in a fiber direct-connect system. Similarly to the optical modulator shown in FIG. 1, the optical modulator shown in FIG. 27 is used, in a transmitting unit of, for example, an ultra high-speed optical communication system, as an external optical modulator for modulating light emitted from a signal light source such as a semiconductor laser or the like.

Figure 28:
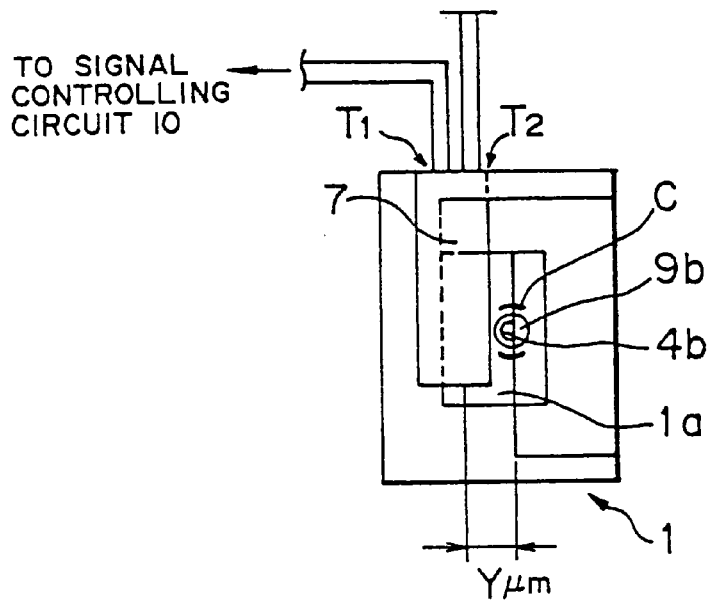
FIG. 28 is a sectional view of the optical modulator shown in FIG. 27 taken along line B—B.

FIG. 28 is a sectional view of the optical modulator 20A of a Mach-Zehnder type shown in FIG. 27, taken along line B—B.

The optical modulator 20A of a Mach-Zehnder type shown in FIG. 27 is formed similarly to the optical modulator 20 of a Mach-Zehnder type shown in FIG. 1, excepting that the optical fibers 9a and 9b are directly connected to the optical waveguide device 1 of a Mach-Zehnder type within the package 13.

Namely, there are provided two holes H in the package 13, into which the optical fibers 9a and 9b are inserted, as shown in FIG. 27.

A tip of the optical fiber 9a is fixed to an end of the input waveguide 4a on the end surface on the inputting side of the substrate 1a of the optical waveguide device 1 of a Mach-Zehnder type, whereas a tip of the optical fiber 9b is fixed to an end of the output waveguide 4b on the end surface on the outputting side of the substrate 1a of the optical waveguide device 1 of Mach-Zehnder type, both with an adhesive C or the like.

In this case, the photo-detector 5 is disposed in the rear stage of the end surface on the outputting side of the substrate 1a to which the optical fiber 9b is connected, below the optical fiber 9b, as shown in FIGS. 27 and 28.

The optical modulator 20A of a Mach-Zehnder type may achieve the same functions and effects as the above-described optical modulator 20 of a Mach-Zehnder type according to the embodiment.

In particular, since the optical modulator 20a of a Mach-Zehnder type is of a fiber direct-connect type, the phase of the interference light is arbitrarily set, and the optical fiber 9b and the photo-detector 5 are disposed a desired distance apart, whereby the optical modulator 20a of a Mach-Zehnder type may be readily fabricated.

What is claimed is:

1. An optical modulator comprising:
   a substrate having an opposing top and bottom and a plurality of sides extending between the top and bottom;
   an optical waveguide formed on the top of said substrate, the optical waveguide having two subwaveguides and a combining portion where the subwaveguides meet, the optical waveguide emitting at least one of radiation light and signal leakage light;
   an electrode formed on the top of said substrate to control light propagation in said optical waveguide;
   a photo-detector positioned directly adjacent to one side of the substrate, at an end of the substrate for monitoring a change in said radiation light or said signal leakage light emitted from the side of the substrate; and
   a signal controlling circuit for varying a direct-current bias applied to said electrode according to the change in said radiation light or said signal leakage light monitored by said photo-detector to control an operating point of said optical modulator.

2. The optical modulator according to claim 1, wherein
   the optical waveguide emits both radiation light and signal leakage light, and
   the optical modulator further comprises an interference light generating device to receive the radiation light and signal leakage light from the optical waveguide, to cause the radiation light to interfere with the signal leakage light to thereby generate interference light and to guide the interference light to the end of the substrate.

3. The optical modulator according to claim 2, wherein said interference light has the same phase as the signal leakage light.

4. The optical modulator according to claim 2, wherein said interference light has an inverted phase from the signal leakage light.

5. The optical modulator according to claim 1, wherein a photo-detecting element is disposed on a p late member to form said photo-detector.

6. The optical modulator according to claim 5, wherein said plate member is a ceramic substrate.

7. The optical modulator according to claim 5, wherein said photo-detecting element is a bare chip.

8. The optical modulator according to claim 1, wherein said substrate is a lithium niobate substrate.

9. The optical modulator according to claim 1, wherein the optical waveguide is a Mach-Zehnder optical waveguide.

10. The optical waveguide according to claim 1, wherein the substrate has an electrooptic effect.

11. The optical modulator according to claim 1, wherein
    the optical waveguide has an output waveguide with a curved portion, and
    the combining portion couples the subwaveguides to the output waveguide.

12. The optical modulator according to claim 1, wherein the electrode causes light propagated in one of the subwaveguides to have a different phase from light propagated in the other of the subwaveguides such that destructive interference occurs at the combining portion to produce radiation light.

13. The optical modulator according to claim 1, wherein
    the optical waveguide has an output waveguide,
    the combining portion couples the subwaveguides to the output waveguide,
    the optical modulator further comprises an output optical fiber and a lens positioned between the output waveguide and the output optical fiber, and
    the photo-detector is positioned between the substrate and the lens.

14. The optical modulator according to claim 12, wherein
    the optical waveguide has an output waveguide,
    the combining portion couples the subwaveguides to the output waveguide with the output waveguide running toward an end surface of the substrate,
    the optical modulator further comprises an output optical fiber, and
    both the output optical fiber and the photo-detector are positioned at the end surface of the substrate.

15. The optical modulator according to claim 12, wherein
    the optical waveguide has an output waveguide,
    the combining portion couples the subwaveguides to the output waveguide,
    the output waveguide has a depth in the substrate from a surface of the substrate, and
    the photo-detector is positioned further from the surface of the substrate in the depth direction than the output waveguide.

16. The optical waveguide according to claim 15, wherein the photo-detector is positioned from 550 $\mu$m to 750 $\mu$m further from the surface of the substrate in the depth direction than the output waveguide.

17. The optical modulator according to claim 1, wherein
    the optical waveguide emits both radiation light and signal leakage light,
    the optical modulator further comprises an interference light generating device to receive the radiation light and signal leakage light from the optical waveguide, to cause the radiation light to interfere with the signal leakage light to thereby generate interference light and to guide the interference light to the end of the substrate,
    the optical waveguide has an output waveguide,
    the combining portion couples the subwaveguides to the output waveguide,
    the output waveguide has a depth in the substrate from a surface of the substrate, and the phase and intensity of the interference light are set such that the interference light is emitted from the substrate at a position further from the surface of the substrate in the depth direction than the output waveguide.

18. The optical modulator according to claim 17, wherein the signal leakage light is emitted from the combining portion of the optical waveguide, and an intensity of the signal leakage light emitted from the combining portion of said optical waveguide is adjusted in order to set the phase and the intensity of said interference light.

19. An optical modulator including a substrate having an opposing top and bottom and a plurality of sides extending between the top and bottom, an optical waveguide formed on the top of said substrate, the optical waveguide having two subwaveguides and a combining portion where the subwaveguides meet, the optical waveguide emitting at least one of radiation light and signal leakage light and an electrode formed on the top of said substrate to control light propagated in said optical waveguide, comprising:

a photo-detector positioned directly adjacent to one side of the substrate at the end of the substrate for monitoring a change in the radiation light or the signal leakage light emitted from the side of said substrate; and a signal controlling circuit for varying a direct-current bias applied to said electrode according to the change in the radiation light or the signal leakage light monitored by said photo-detector to control an operating point of said optical modulator.

20. A method for forming an optical modulator comprising the steps of:

(a) diffusing titanium into a top of a substrate having an opposing top and bottom and a depth from the top of the substrate toward the bottom, the titanium being diffused in a pattern corresponding to an optical waveguide having two subwaveguides and a combining portion where the subwaveguides meet, the optical waveguide emitting radiation light and signal leakage light and wherein interference light is generated by the interference of the radiation light and signal leakage light;

(b) forming an electrode on the substrate to control light propagating in the optical waveguide; and (c) controlling titanium diffusion into the substrate to thereby increase the depth at which interference light is emitted from the substrate.

21. An optical modulator comprising:

a substrate having an opposing top and bottom and a plurality of sides extending between the top and bottom;

an optical waveguide formed on the top at said substrate, the optical waveguide having two subwaveguides and a combining portion where the subwaveguides meet, the optical waveguide emitting interference light which is generated by interfering radiation light and signal leakage light;

an electrode formed on the top of said substrate for controlling light propagation in said optical waveguide; and a photo-detector positioned for detecting the interference light emitted from the side of the substrate wherein the photo-detector is positioned directly adjacent to the side of the substrate at an area occupied by the peak of the intensity of the interference light.

22. The optical modulator according to claim 21, wherein the photo-detector is connected to a signal controlling circuit, and wherein the signal controlling circuit varies a direct-current bias applied to said electrode according to the change in the interference light monitored by said photo-detector to control an operating point of said optical modulator.

* * * * *